United States Patent [19]

Saarem et al.

[11] 4,398,562

[45] Aug. 16, 1983

[54] MOTORIZED DIVERTER VALVE

[75] Inventors: Myrl J. Saarem; Donald E. Lovelace, both of Carson City, Nev.

[73] Assignee: Richdel, Inc., Carson City, Nev.

[21] Appl. No.: 280,269

[22] Filed: Jul. 6, 1981

[51] Int. Cl.³ .................... F16K 31/04; H02P 7/78
[52] U.S. Cl. .......................... 137/625.47; 251/130; 251/134; 318/47; 318/112; 74/665 B; 126/422
[58] Field of Search .................... 251/134, 130; 137/625.47; 318/112, 47; 74/665 B; 126/422

[56] References Cited

U.S. PATENT DOCUMENTS

| | | | |
|---|---|---|---|
| 2,215,646 | 9/1940 | Kuhns | 318/45 X |
| 2,808,551 | 10/1957 | Morrison | 318/47 |
| 3,231,803 | 1/1966 | Pryor et al. | 318/45 |
| 3,248,080 | 4/1966 | Plasko | 251/130 X |
| 3,334,859 | 8/1967 | Raymond, Jr. | 251/134 |
| 3,549,965 | 12/1970 | Hausmann | 318/47 |

*Primary Examiner*—Arnold Rosenthal

*Attorney, Agent, or Firm*—Keith D. Beecher

[57] ABSTRACT

A motor driven diverter valve is provided which diverts fluid flow from a single inlet port to either one of two outlet ports, or vice versa. The valve finds general, although not exclusive, utility in solar heating systems for swimming pools, in which the valve is used selectively to divert water flow from the normal pump-filter loop of the pool installation through the solar collectors. In such an application, the diverter valve of the invention may be operated automatically in response to an electrical switching signal derived, for example, from a temperature controller in the solar heating control system, to direct the water through the solar collectors for one operating position of the valve, and to by-pass the solar collectors for a second operating position. The valve of the invention uses two synchronous permanent magnet drive motors which together consume less power than the conventional single shaded pole motor/gear box arrangement of the prior art.

5 Claims, 9 Drawing Figures

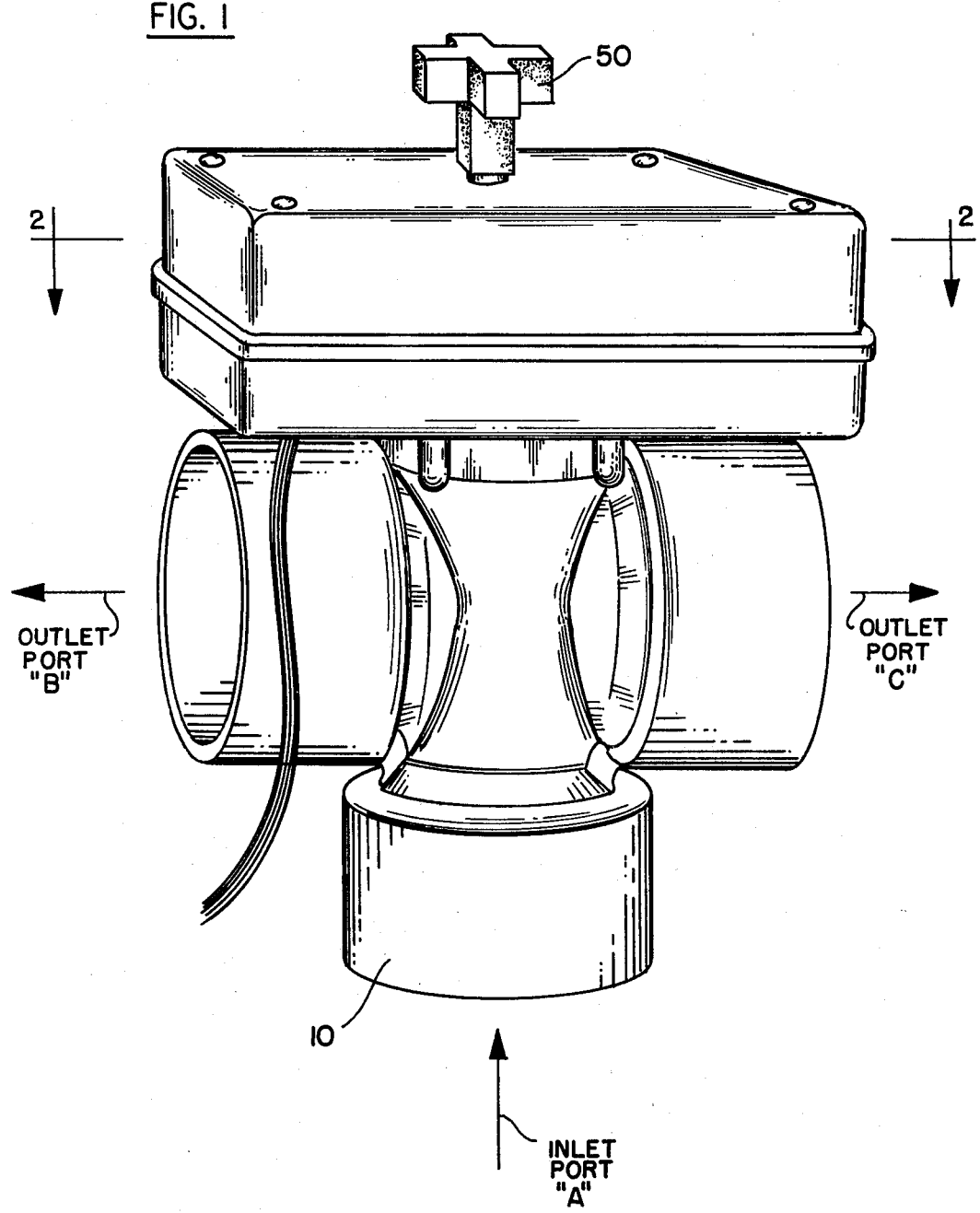

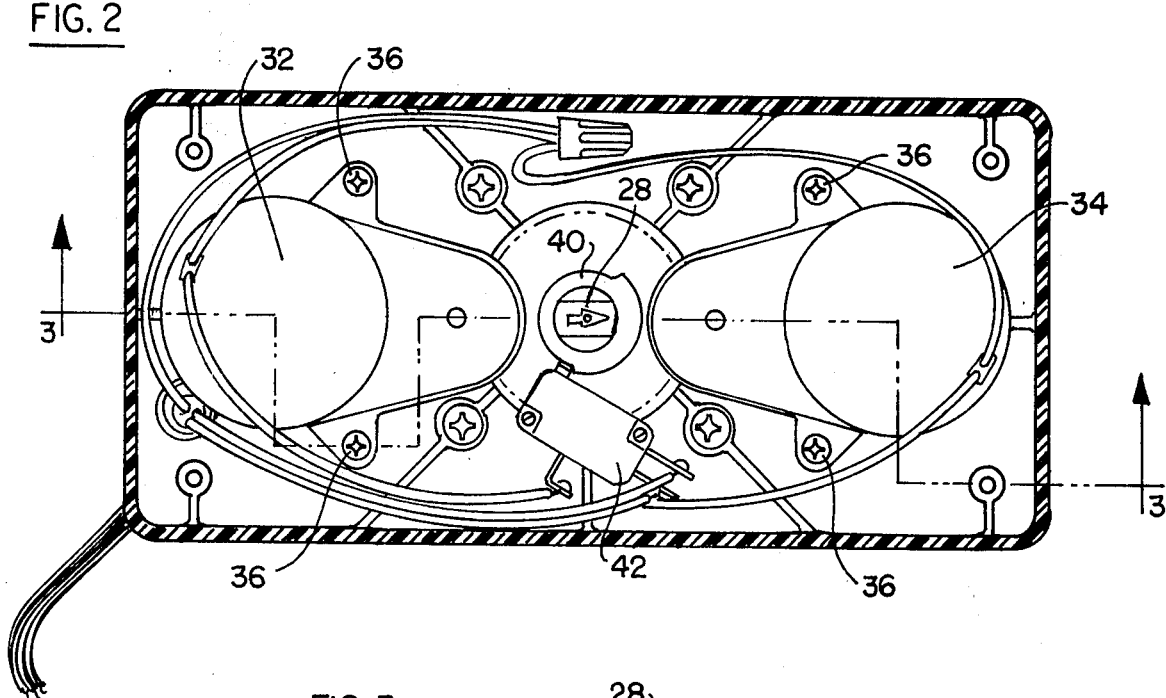
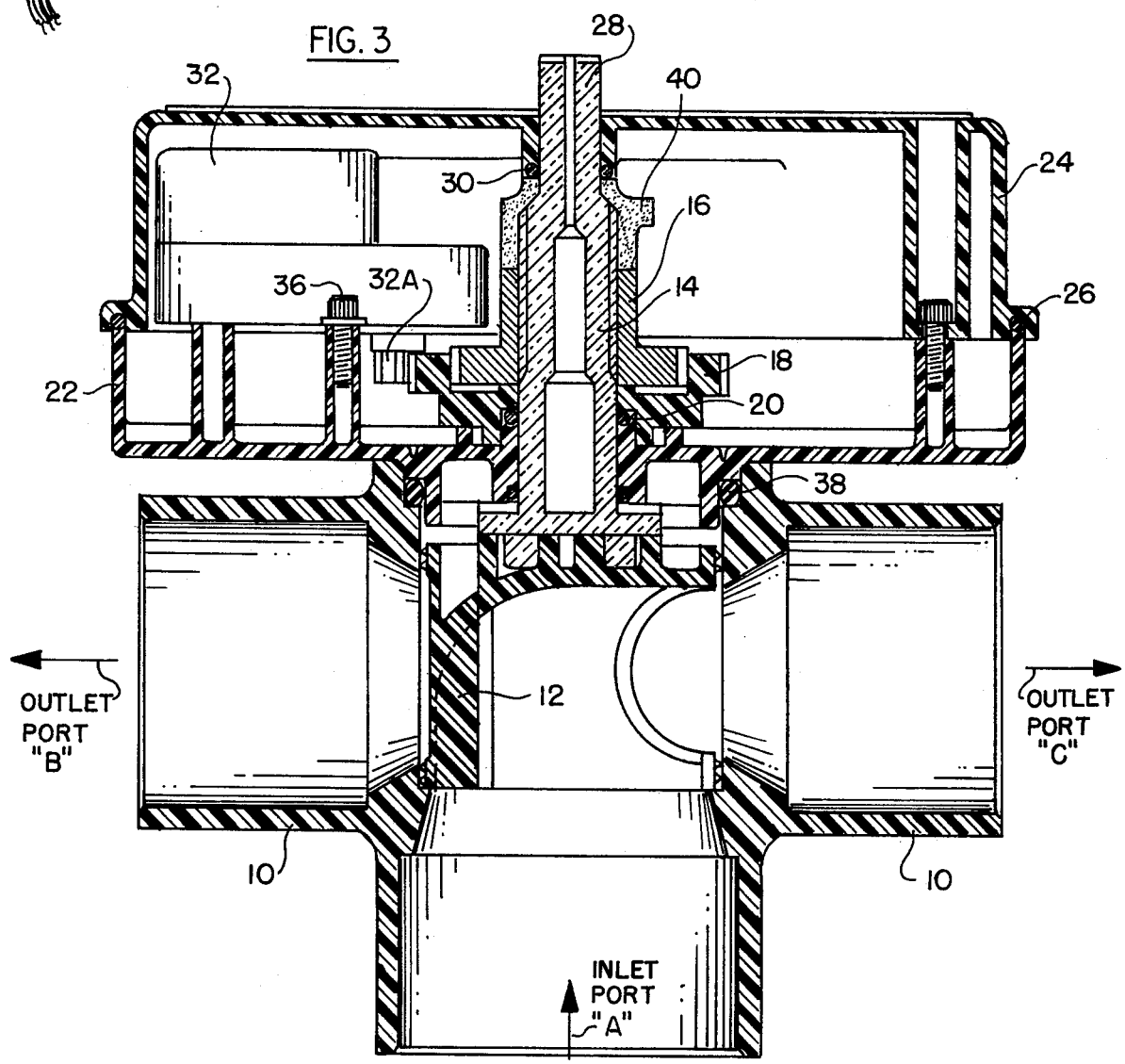

MOTORIZED DIVERTER VALVE

SUMMARY OF THE INVENTION

The diverter valve assembly of the invention, as mentioned above, includes two drive motors, and these are located on diametrically opposite sides of the central drive gear of the valve, and serve to balance the loading of the gear. The gear is mounted on the central shaft of the valve, and the motors are spaced apart to permit the shaft to extend through the cover of the motor compartment to provide a visual indication of the angular position of the shaft which, in turn, is an indication of the position of the valve. Moreover, the shaft extension permits a handle to be attached to the other end of the shaft for manual operation of the valve when it is not electrically energized, such manual operation being made possible by the provision of a one-way clutch located within the central drive gear which automatically decouples the central shaft from the drive motors when the shaft is rotated in a particular direction as the handle is turned. A cam operated switch assembly is provided to cause the motors to be energized in each instance only long enough to turn the diverter member of the valve from one of its two operating positions to the other.

BRIEF DESCRIPTION OF THE DRAWINGS

FIG. 1 is a perspective representation of a diverter valve constructed in accordance with the concepts of the invention;

FIG. 2 is a top view of the valve of FIG. 1, taken along the line 2—2;

FIG. 3 is a side sectional view of the valve taken essentially along the line 3—3 of FIG. 2;

DETAILED DESCRIPTION OF THE ILLUSTRATED EMBODIMENT

Figure 6:
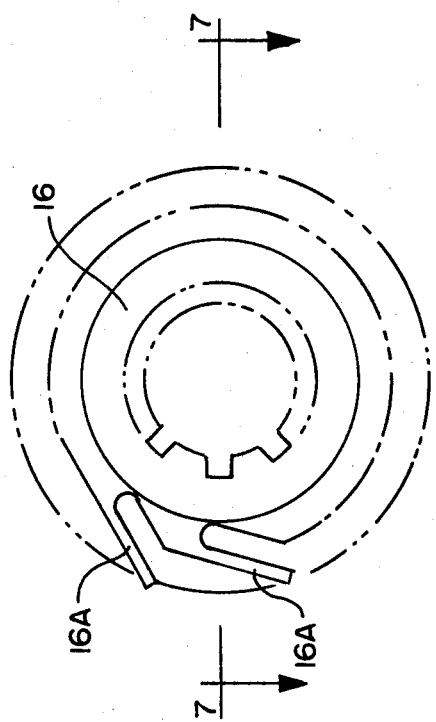
FIG. 6 is a partial plan view of a clutch which is incorporated in the valve mechanism.

As shown in FIGS. 1, 2 and 3, the diverter valve of the invention includes a body 10 which, as shown in FIG. 3 defines an inlet port A, and a pair of outlet ports B and C. A diverter member 12 (FIG. 3) is mounted within body 10, and is affixed to the lower end of a drive shaft 14. Body 10 may be made of any appropriate plastic material, such as, polyvinylchloride (PVC). The drive shaft is rotated about a particular axis, and when it is rotated about that axis, it turns the diverter member 12 from a first position in which it couples the inlet port A to the outlet port B, and the position illustrated in FIG. 3, in which it couples the inlet port A to the outlet port C. A clutch 16 is mounted on shaft 14, and is affixed to the shaft. A gear 18 is mounted concentrically with the clutch 16, and is rotatably mounted on the shaft, the gear being sealed by means of an O-ring 20.

The shaft is rotatably mounted on body 10, and it extends outwardly from the body through a motor housing 22, and through the cover 24 of the motor housing. The cover 24 is sealed to the housing by an O-ring 26. As shown, the shaft 14 extends out through the cover 24. An indicator arrow 28 is integral with the end of the shaft to indicate the angular position of the shaft, and the position of the diverter member 12, so as to indicate which of the two outlets is coupled by the diverter to the inlet. The cover 24 is sealed to shaft 14 by an O-ring 30.

A pair of drive motors 32 and 34 are mounted within the motor housing, both motors being shown in FIG. 2, but only one motor being shown in FIG. 3. These motors, as mentioned above, are mounted on diametrically opposite sides of the drive shaft 14, and are spaced apart so that the drive shaft may extend between the two motors and out through the cover of the housing compartment. These motors are preferably of the synchronous permanent magnet type, which are low wattage motors which in combination use less current than a single conventional shaded pole motor, as mentioned above. The motors are mounted in the motor housing by screws, such as screws 36. The motor housing is sealed to the body by an O-ring 38.

A cam 40 is mounted on the shaft 14 adjacent to gear 18. The cam actuates a microswitch 42 each time the shaft is turned through 180°, turning the diverter member 12 from its first position in which the inlet port A is coupled to one of the outlet ports B or C, and its second position in which the inlet port A is coupled to the other of the outlet ports.

A handle 50 (FIG. 1) may be mounted on the protruding end of shaft 14, and turns the shaft in the same direction in which it is driven by the motors 32 and 34, when the motors are de-energized, for manual operation of the valve. This turning of the shaft by handle 50 is permitted by clutch 16, which is a one-way clutch.

Figure 7:
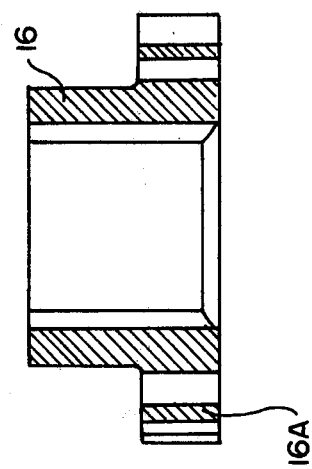
FIG. 7 is a sectional view of the clutch taken essentially along the line 7—7 of FIG. 6.
Figure 4:
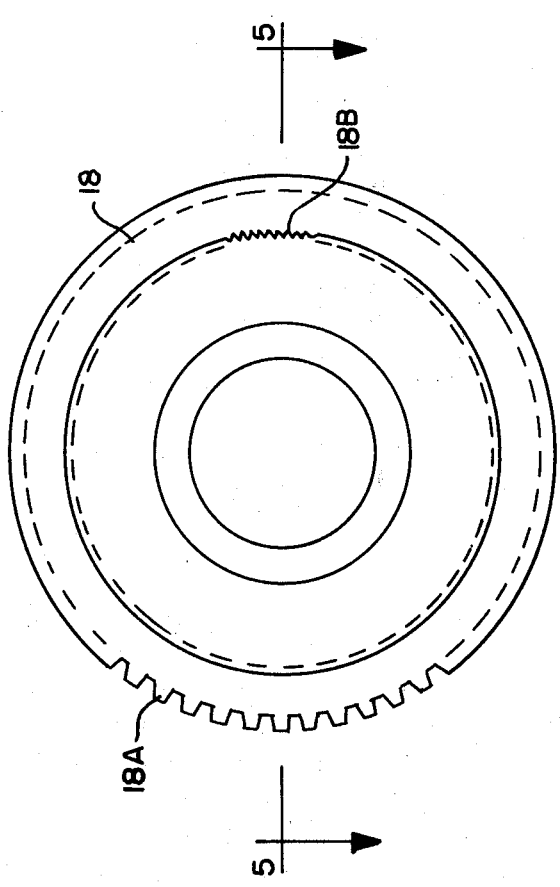
FIG. 4 is a plan view of a drive gear which is used in the valve assembly of FIGS. 2 and 3.
Figure 5:
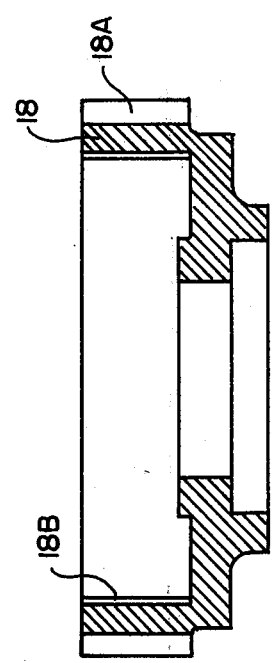
FIG. 5 is a sectional view of the gear of FIG. 4 taken along the line 5—5 of FIG. 4.

As shown in FIGS. 4 and 5, gear 18 has teeth 18A around its outer periphery which engage gears, such as gear 32A (FIG. 3) on the drive shafts of the motors 32 and 34. The gear 18 also has internal teeth 18B which are engaged by fingers 16A of clutch 16 (FIGS. 6 and 7). The clutch and gear are made of plastic material such as ACETAL PLASTIC. This material is resilient, and when the gear 18 is turned in one direction, the ends of fingers 16A of the clutch engage the teeth 18B of the gear so that the torque exerted on the gear is transmitted to the drive shaft 14. However, when the drive shaft is rotated manually, the fingers 16A slide along the teeth 18B of gear 18, so that the shaft 14 may be freely turned by handle 50, to turn the diverter member 12 manually from one of its operating positions to the other.

Figure 8:
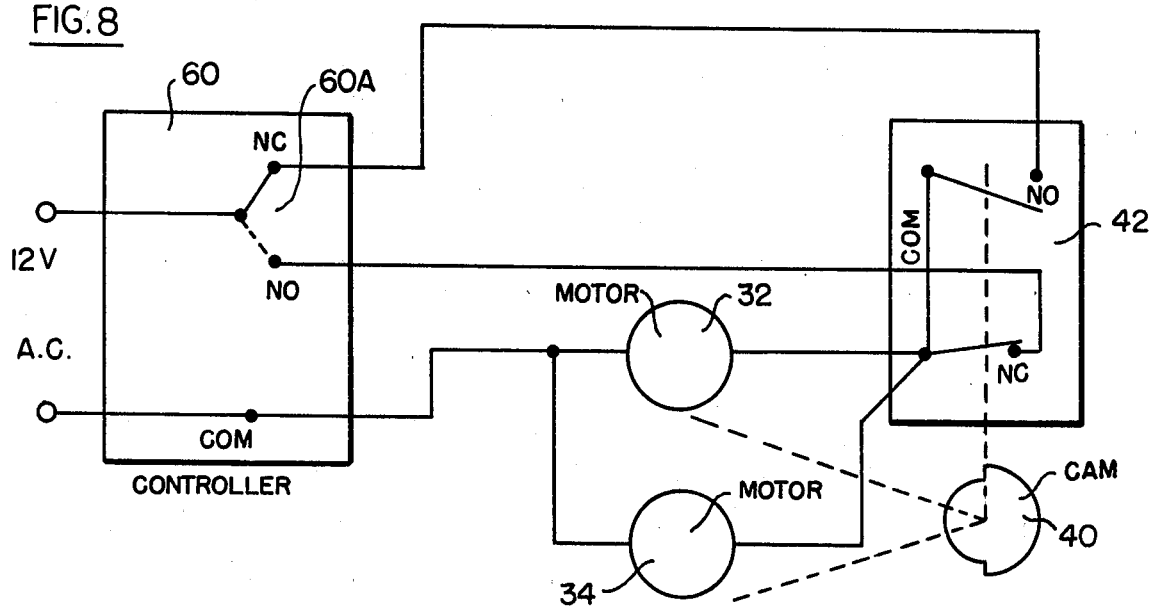
FIG. 8 is an electrical circuit diagram showing the manner in which the motorized diverter valve of the invention may be controlled.

The valve assembly of the invention may be controlled by a controller 60 (FIG. 8) of the type described in U.S. Pat. No. 4,195,621, which is assigned to the present assignee. The controller includes a switch 60A, which is a single pole double throw switch, and which has a normally closed position NC, and a normally open position NO. The switch 60A is connected to the microswitch 42 as shown, the microswitch also including a pair of normally open contacts NO, and a pair of normally closed contacts NC. The controller connects the 12 volt alternating current voltage derived from an appropriate source to the motors 32 and 34, and to the microswitch 42 by the connections illustrated in FIG. 8. For a first operation of the switch, the controller connects the switch 60A to its NC contacts, as shown, and the motors 32 and 34 are energized through the NC contacts of microswitch 42, and shaft 14 turns, turning the diverter valve 12 from it first operating position to its second operating position. When the diverter member reaches its second operating position, cam 40 actuates the microswitch opening the contacts NC, and closing the contacts NO, so that the motors 32 and 34 are deenergized.

When the switch is next to be operated, the controller closes the contacts NO of switch 60A, again energizing the motors 32 and 34, this time through the closed contacts NO of microswitch 42. The motors are again energized, and shaft 14 turns the diverter 12 back to its first operating position, at which time cam 40 now causes the microswitch 42 to close its NC contact and open its NO contact, again de-energizing the motors, until the controller next changes the position of switch 60A.

Figure 9:
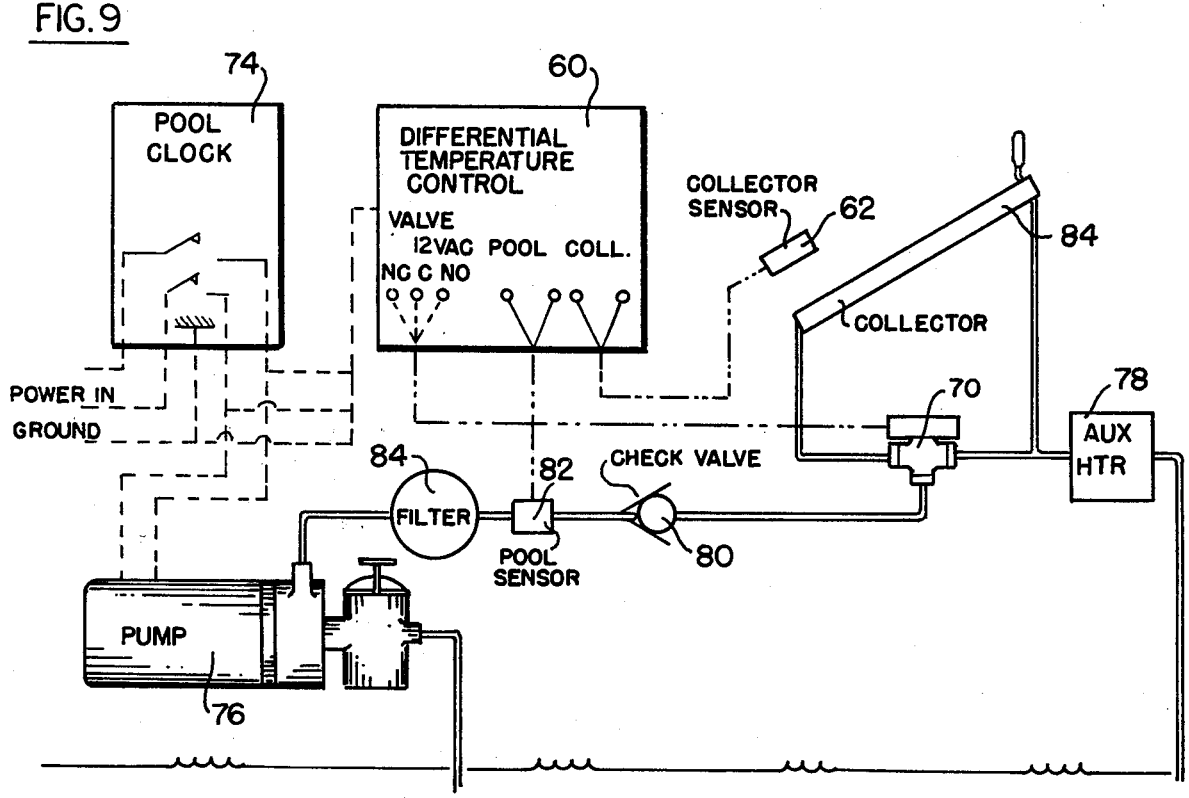
FIG. 9 shows the valve incorporated into a solar heated swimming pool installation for diverting the water flow from the normal pump-filter loop of the pool through the solar collectors, and vice versa, in response to appropriate electrical control signals.

By way of example, the valve of the invention, which is indicated 70 in FIG. 9 may be incorporated into the water circulation system of a swimming pool 72. During normal operation, and when the pool clock 74 energizes the system, pump 76 circulates water from the pool through a filter 84, through a sensor 82, through a check valve 80, and through an auxiliary heater 78 back into the pool. At certain intervals, the differential temperature controller 60, operating in response to a signal from a collector sensor 62, causes the valve 70 to divert water from the pump through a solar collector 84. This causes the water to circulate through the collector 84, until the controller 60, responding to signals from sensors 62 and 82, again operates valve 70, to cause the water to circulate through the normal circulation system of the pool.

As mentioned above, the system of FIG. 9 represents but one system in which the diverter valve of the invention may be incorporated, and the use of the diverter valve is in no way limited to that system, or to any particular system.

Accordingly, although a particular embodiment of the invention has been shown and described, modifications may be made, and it is intended in the claims to cover all modifications which come within the true spirit and scope of the invention.

What is claimed is:

1. A diverter valve assembly including a body defining a single inlet port and a pair of outlet ports; a housing mounted on said body; a drive shaft mounted on said body and extending into said housing to be rotatable about a particlar axis; a diverter member mounted in said body on one end of said drive shaft to be turned by said drive shaft selectively to divert fluid from said inlet port to respective ones of said outlet ports as said shaft is rotated about said particular axis; a pair of drive motors mounted in said housing on opposite sides of said drive shaft; means including a gear coaxially mounted with respect to said drive shaft for coupling respective ones of said drive motors to said drive shaft; a cam mounted on said drive shaft within said housing for rotation with said drive shaft; switching means mounted in said housing in position to be operated by said cam when the drive shaft is turned from a first predetermined angular position to a second predetermined angular position in which said inlet port is coupled to one of said outlet ports by said diverter member, and when said drive shaft is turned from said second pre-determined angular position to said first predetermined angular position in which said inlet port is coupled to the other of said outlet ports by said diverter member; and means electrically connecting said switching means to said motors to cause said motors to be deenergized each time the switching means is operated by said cam.

2. The diverter valve assembly defined in claim 1, in which said drive motors are of the synchronous permanent magnet type.

3. The diverter valve assembly defined in claim 1, in which said last-named means includes a one-way clutch coaxially mounted on said drive shaft and affixed thereto, and concentrically mounted with respect to said gear to couple said gear to said drive shaft when said gear is rotated in a particular direction, but to decouple the drive shaft from the gear when the drive shaft is rotated manually in said particular direction.

4. The diverter valve assembly defined in claim 3, in which said drive shaft extends through said housing, and which includes a handle mounted on the other end of said drive shaft for rotating said drive shaft manually in said particular direction, and thereby turning said diverter member about said particular axis.

5. The diverter valve assembly defined in claim 3, in which said drive shaft extends through said housing, and which includes an indicator mounted on the other end of said drive shaft for indicating which of said two outlet ports is coupled to said inlet port by said diverter member.

* * * * *